May 21, 1968     R. F. O'CONNOR     3,384,394

CONNECTOR FOR A PIPE THREADED PORT

Filed Feb. 23, 1967

INVENTOR
RAYMOND F. O'CONNOR
BY
*Burton & Parker*
ATTORNEYS 3,384,394
CONNECTOR FOR A PIPE THREADED PORT
Raymond F. O'Connor, Rochester, Mich., assignor to Kent-Moore Organization, Inc., Warren, Mich., a corporation of Michigan
Filed Feb. 23, 1967, Ser. No. 618,049
3 Claims. (Cl. 285—190)

ABSTRACT OF THE DISCLOSURE

In general, this disclosure relates to a banjo-type hose connector for a tapered pipe threaded port, in which the connector has a straight threaded rotatable stem of a pipe thread pitch, received within a body member, of a diameter slightly less than the diameter of the tapered port measured at the end of the threaded stem. In the disclosed embodiment, the connector body is generally T-shaped, and has a chamber communicating through each end with a lateral port, and a stem rotatably received in the chamber. The stem is threaded as described at one end, and is provided with a handle at the opposite end. The end of one arm of the T-shaped body has a counterbore adapted to receive a sealing means, while the opposite end is flat, and the body is reversible on the stem such that the body will seal a port having a peripheral spot face, or a port wherein the periphery is flat.

FIELD OF THE INVENTION

This invention is particularly, although not exclusively adapted to quick connect and disconnect hose couplings for a tapered pipe threaded port, where the access to the port is limited. For example, the hose connector of this invention may be utilized in a test stand or the like where fluid is to be supplied to a device to be tested having pipe threaded ports, such as a test stand for fuel inlet and exit ports in a diesel engine fuel injection pump.

DESCRIPTION OF THE PRIOR ART

Connectors for tapered pipe threaded ports shown by the prior art generally include an adaptor or nipple which has a male tapered pipe threaded end, and an opposed male straight threaded end. The nipple is provided with a hexagonal mid-portion which is engaged by a wrench means or the like to thread the tapered end of the nipple into the pipe threaded port. The tapered threads effect the seal in the port, and therefore generally require thread sealant or caulking. A swivel hose connector is then threadably connected to the straight threaded end of the nipple. Such couplings have many disadvantages, especially in test equipment where the coupling must be continually connected and disconnected. For example, the torque required to seal the tapered end of the nipple in the port may damage the threads of the port, or even crack the wall of the device tested. Further, because the nipple must be connected with a wrench or the like, it may be difficult to adequately seal the nipple connection where access to the port is limited. And, the connection and removal of the nipple is time consuming, especially where the device to be tested has several ports.

Another hose connector shown by the prior art is the "banjo connector," which is similar in construction to the connector of this invention. Several types of banjo couplings are shown by the prior art, however these connectors are not adapted for threaded connection in a tapered pipe threaded port. The stem means is adapted to thread into a conventional straight threaded female port. An object of this invention is to adapt the advantages of a banjo-type coupling to a connector adapted for threaded connection in a tapered pipe threaded port.

SUMMARY OF THE INVENTION

Briefly, the hose connector of this invention includes a connector body member having a sealed chamber communicating through a lateral port with a hose connection. A stem means is rotatably received within the body chamber, and has a threaded end extending through one end of the chamber, and an external operating means, such as a knob, extending through the opposite end. The stem means is provided with a chamber which communicates through the threaded end with the pipe threaded port and at the opposite end through the lateral port defined in the body member. The threaded end of the stem means is a straight thread of a diameter slightly less than the diameter of the tapered pipe threaded port, measured at the end of the threaded stem when the stem is fully threaded into the threaded port, by rotation of the external operating means of the stem. The threads have a pipe thread pitch to mate with the pipe threaded port. Threading of the stem means into the pipe threaded port draws the adjacent end of the connector body portion in sealing engagement against an opposed surface defined about the threaded port. A sealing means, such as an O-ring or the like, may be provided at the end of the body portion adjacent the threaded stem, and a sealing means may also be provided between the opposite end of the body member, between the body member and the external operating means, to seal the opposite end of the chamber.

According to one embodiment of the hose connector of this invention, the connector body member is generally T-shaped, and the end of one of the arms of the body member has a counterbore for receiving a sealing means, such as an O-ring. The opposite end or arm of the body member is flat, and the stem means is reverseable in the body member to permit sealing engagement between the body member and the surface defined about the tapered port, whether or not a spot face is provided adjacent the tapered pipe threaded bore. Thus, the flat end of the body member will be disposed adjacent the threaded bore where a spot face has been provided adjacent the pipe threaded bore, and the opposite end of the body member may be disposed adjacent the threaded port where no spot face is provided. This relationship will be more fully described in the description of the drawings which follows:

Figure 1:
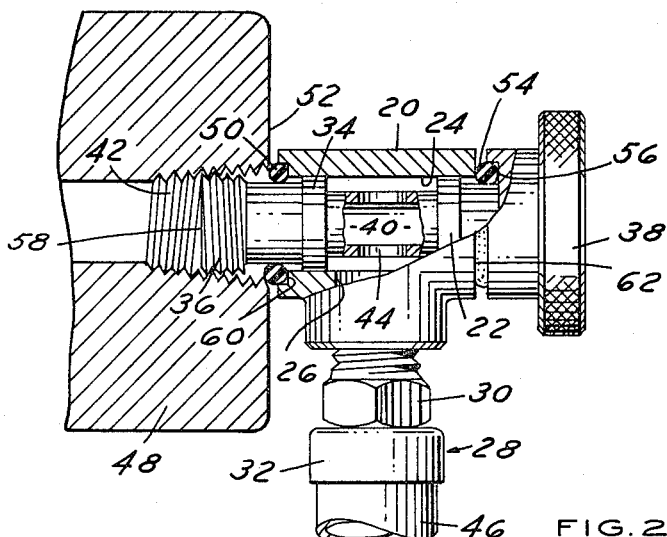
FIGURE 1 is a partially cross sectioned side view of the hose connection of this invention.
Figure 2:
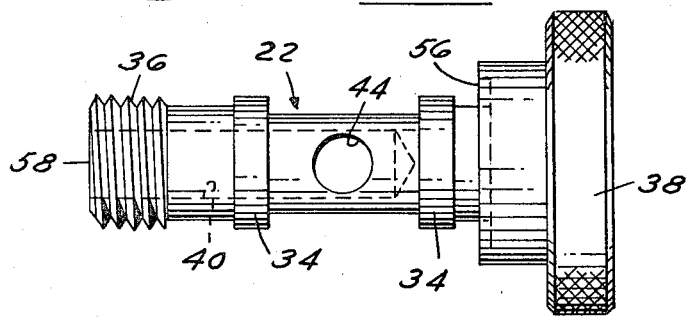
FIGURE 2 is a side view of the stem means utilized in FIGURE 1.

In the embodiment of the hose connection shown in the drawings, the connector includes a generally T-shaped body member 20 and a threaded stem means 22. The connector body member is provided with a chamber 24 which communicates through a lateral port 26 with a hose connection 28. The hose connection may be of any conventional type, and in this embodiment includes a nipple 30 threaded into the lateral port 26, and a sleeve 32 rotatably secured to the nipple.

The stem means is rotatably received within the connector body chamber 24, and includes integral bearing means 34 which supports the stem means during rotation. The stem means is threaded at one end 36, and is provided with a knob 38 or the like at the opposite end, which may be knurled as shown. An axial hole has been drilled through the threaded end of the stem to define a chamber 40 which communicates, through the threaded end of the stem, with the tapered pipe threaded port 42, and the lateral port 26 of the body member, through ports 44. A fluid passage is thus established between the pipe threaded port 42 and the hose 46. The pipe threaded port 42 is conventional in many fluid systems, and is not dependent upon the function or structure of the housing or body member 48. For example, the pipe threaded port 42 may be a fuel inlet or exit port of a diesel engine fuel injection pump, through which the rate of fluid flow is to be measured.

The connector, according to my invention, does not provide sealing between the threads 36 of the stem means and the tapered pipe threaded port 42. Sealing is effected by a sealing means 50, such as an O-ring or the like, disposed between the forward end of the connector body member 20, and the opposed surface 52 surrounding the pipe threaded port 42. A second sealing means is disposed between the opposite end of the connector body member and the external operating means 38 in a counterbore 56 defined in the forward portion of the knob, or external operating means 38. The seals 50 and 54 are compressed into sealing engagement when the stem means 22 is fully threaded into the pipe threaded port 42, by threaded rotation of the operating means 38. An advantage of the connector of this invention is that the seal is effected by hand tightening of the stem means in the pipe threaded port, eliminating the need for a wrench.

Figure 3:
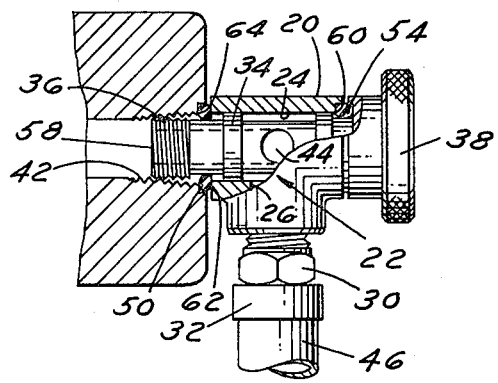
FIGURE 3 is a partial cross sectional view similar to FIGURE 1, with the body portion reversed to accommodate a spot face provided adjacent the pipe threaded bore.

As stated hereinabove, a primary object of the hose connector of my invention is to provide a quick connect and disconnect coupling adapted for use in a tapered pipe threaded port, such as the port 42. This has been accomplished by providing a thread 36 on the end of the stem means 22 of a diameter slightly less than the diameter of the tapered pipe threaded port 42, measured at the end of the threaded stem 58 when the stem is fully seated in the threaded port. The use of a thread, which is slightly undersize, permits the use of a straight threaded stem which does not bind or seal within the tapered threaded port; but serves as a means of drawing the connector body and seal securely against the surface of the housing adjacent the threaded port, as shown in FIGURES 1 and 3. The thread pitch, however, should be adapted to mate with the tapered pipe threaded port.

The embodiment of the connector body shown in the drawings is designed such that it may be reversed with respect to the stem to accommodate a spot face or counterbore in the surface of the housing 52, adjacent the pipe threaded bore 42. One end of the connector body is provided with a counterbore 60, and the opposite end 62 is flat. In the embodiment of the housing 48 shown in FIGURE 1, the surface adjacent the pipe threaded port 42 is flat, and the end of the housing having the counterbore 60 is disposed adjacent the housing surface 52 to retain the sealing means 50. Where the surface of the housing is provided with a spot face, as shown at 64 in FIGURE 3, the body member is reversed, and the flat end of the housing 62 is disposed adjacent the housing. The housing is reversed merely by removing the stem means 22 and reversing the stem within the housing. The arrangement shown in FIGURE 3 provides maximum projection of the front seal, to compress the seal within a spot face. The arrangement shown in FIGURE 1 retains the seal in the counterbore, and compresses the seal against the opposed surface of the housing.

What is claimed is:

1. A hose connector for a tapered pipe threaded port, comprising: a connector body member having a sealed chamber communicating through a lateral port with a hose connection, a hollow stem means rotatably received within and projecting beyond both ends of said connector body chamber, said stem having one threaded end and an external operating means secured to the opposite end, means sealing said stem means in said chamber and including at least one seal means carried at least partially exposed beyond the end of said connector body adjacent said threaded end of said stem, said stem means defining a chamber communicating through said threaded end with the lateral port of said body member, said threaded end adapted to be threadably received in the tapered pipe threaded port to draw the adjacent end of said connector body portion in sealing engagement against an opposed surface defined about the threaded port, said threaded end of the stem being a straight machine thread having substantially the same number of threads per inch as threads in the tapered pipe threaded port and of a pitch diameter less than the pitch diameter of the tapered pipe threaded port measured adjacent the end of the stem when said body portion is disposed in sealing engagement with the opposed surface surrounding the entrance to the port, such that there is thread clearance between the crest of the threaded stem and the root of the pipe threaded port after said stem has been fully drawn into the port by the threads of the port as far as permitted by said sealing engagement of the body portion.

2. The hose connector defined in claim 1, characterized in that said connector body member is generally T-shaped, the end of one of the arms of said body member having a counterbore receiving a sealing means to seal the chamber defined in said body member, and the end of the opposite arm being flat and said stem means reverseable in said body member to permit sealing engagement of either end of said body member against the surface defined about the tapered pipe threaded port.

3. A hose connection, comprising: a body member having a tapered pipe threaded port, a connector body member having a sealed chamber communicating through a lateral port with ah ose connection, a hollow stem means rotatably received wihtin said chamber and projecting beyond both ends, said stem means having a threaded end threadably received within said tapered pipe threaded port and an external operating means secured to the opposite end, said stem means defining a chamber communicating with said tapered pipe threaded port through said threaded end and said lateral port, said external operating means rotatable to thread and unthread said threaded end from said tapered pipe threaded port, a sealing means carried at least partially exposed beyond the end of said connector body adjacent said threaded end of said stem means disposed between the surface defined about said tapered pipe threaded port and the adjacent end of said body portion sealing the chamber defined by said body portion, said threaded end of the stem being a machine thread having substantially the same number of threads per inch as threads in said tapered pipe threaded port and of a pitch diameter less than the pitch diameter of said tapered pipe threaded port measured adjacent the end of the stem when said adjacent end of the body portion is disposed in sealing engagement with said surface surrounding the entrance to the port, such that there is thread clearance between the crest of said threaded stem and the root of said pipe threaded port after said stem has been fully drawn into said port by the threads of the port as far as permitted by said sealing engagement of the body portion.

References Cited
UNITED STATES PATENTS

| | | | |
|---|---|---|---|
| 2,075,024 | 3/1937 | Delano | 285—40 |
| 2,307,328 | 1/1943 | Martin | 285—190 |
| 2,400,658 | 5/1946 | Shepherd | 285—190 |
| 3,145,035 | 8/1964 | Hanback | 285—190 X |

FOREIGN PATENTS

| | | |
|---|---|---|
| 1,025,713 | 1/1953 | France. |
| 1,207,275 | 8/1959 | France. |
| 861,036 | 12/1952 | Germany. |

EDWARD C. ALLEN, *Primary Examiner.*
R. G. BERKLEY, *Assistant Examiner.*